United States Patent Office 3,810,865
Patented May 14, 1974

---

3,810,865
DIALLYL PHTHALATE COMPOSITIONS CONTAINING DIACETONE ACRYLAMIDE
James L. Thomas, Baltimore, Md., assignor to FMC Corporation, New York, N.Y.
No Drawing. Continuation of abandoned application Ser. No. 33,927, May 1, 1970. This application Feb. 23, 1973, Ser. No. 335,254
Int. Cl. C08f 21/00
U.S. Cl. 260—42.18                  3 Claims

ABSTRACT OF THE DISCLOSURE

Diallyl phthalate prepolymer compositions having melt viscosites low enough to be used for encapsulating pressure-sensitive devices, whch are blends of diallyl phthalate prepolymer and diacetone acrylamide.

---

This is a continuation of abandoned application Ser. No. 33,927, filed May 1, 1970.

BACKGROUND OF THE INVENTION

Polymers of the diallyl phthalates—principally diallylorthophthalate and diallyl isophthalates—are well known specialty products, particularly in the electrical field, where they are used despite their relatively high price for specialty applications where desirable electrical properties at high humidities are required.

In preparing the polymers for use, they are first polymerized to soluble prepolymers, which are fusible and soluble in monomer and in solvents such as acetone; typical methods for preparing these prepolymers are disclosed in Willard U.S. Pat. 3,030,341, issued Apr. 17, 1962, and in Heiberger U.S. Pat. 3,096,310, issued July 2, 1963. The prepolymers are mixed with catalyst and fillers and often with stabilizer and mold lubricants, to make molding compounds in conventional fashion; these molding powders are then put into conventional molding equipment, and the moldings are heated to activate the catalyst and convert the prepolymers into infusible insoluble thermoset structures.

A major problem with the use of diallyl phthalate molding compositions is posed by their relatively high melt viscosity. This makes the compositions unsuitable for applications where low melt viscosity is essential—for example, the encapsulation of electronic systems in which the relative position of the parts is sensitive to pressure, so that in molding the encapsulating plastic should flow without substantial pressure, and hence must be of low viscosity.

Many methods have been tried to lower the melt viscosity of diallyl phthalate molding compositions, but many additives must be avoided, since they impair the desirable electrical properties of the molding compounds. None have been really satisfactory. Diallyl phthalate monomers and uncut semisolid polyesters lower melt viscosity, but if enough is added to be really effective, caking and blocking of the molding compositions during storage occur, so that these additions are limited to the production of compound at the time of use. Diallyl melamine—a reactive monomer (see my U.S. Pat. 3,455,888, issued July 15, 1969)—can be used successfully to reduce melt viscosity, but it retards cure rates and is very expensive, so that it is not useful except in special situations where the low cure rate and high cost are tolerable.

OBJECT OF THE INVENTION

The principal object of the present invention is the production of diallyl phthalate prepolymer molding compounds with low melt viscosities without retardation of the cure rate and without substantial impairment of the desirable electrical properties of the compound.

STATEMENT OF THE INVENTION

In accordance with this invention, low melt viscosity diallyl phthalate prepolymer molding compositions are made by using a blend of diallyl phthalate prepolymer and diacetone acrylamide, a reactive monomer, using about 2 to 50 parts by weight of diacetone acrylamide per 100 parts of prepolymer, and sufficient catalyst to induce curing on molding, with or without other conventional ingredients used in typical molding compositions, such as particulate and fibrous fillers, color pigments, stabilizers, mold inhibitors and the like. Up to about 15 parts by weight of diallyl phthalate monomer may be present per 100 parts of prepolymer.

DETAILED DESCRIPTION OF THE INVENTION

The diallylic phthalate prepolymers, diallyl orthophthalate and diallyl isophthalate used in this invention are manufactured in a conventional fashion by polymerizing a monomeric material to produce a solution of soluble polymer in monomer, to a point short of gelation, which occurs when the molecular weight of the polymer reaches a point where it becomes insoluble in the monomer. These polymer monomer solutions (called "dopes") are then separated into a solvent-soluble prepolymer fraction, and monomer. This may be done by treatment with a solvent which dissolves the monomer while precipitating the polymer, or by other means which will leave a soluble prepolymer substantially free of monomer, A typical method of separating such polymers is described by Willard in U.S. Pat. 3,030,341, issued Apr. 17, 1962. These prepolymers are solids containing little or no monomers; they can be stored indefinitely in this form, since they require a catalyst and either heat or actinic light to convert them to the insoluble stage.

A wide variety of water-insoluble, inert inorganic fillers may be used in these molding compositions. Fillers which can be used in practicing this invention include calcium carbonate, both precipitated and wet ground types, calcium silicate, ground silica, calcined clays, chalk, limestone, calcium sulfate (anhydrous), barium sulfate, asbestos, glass (powdered), quartz, aluminum oxide, antimony oxide, inert iron oxides, and ground stone such as granite, basalt, marble, limestone, sandstone, phosphate rock, travertine, onyx and bauxite. Additionally, inert fibrous materials may be used such as synthetic fibers, glass fibers, asbestos and cellulosic fibers. These fillers are not essential constituents of the molding composition of this invention, but are useful in improving mechanical properties and in lowering cost. Up to about 100 parts by weight of filler per 100 parts by weight of resinous component may be advantageously used.

The polymer system should also contain a catalytic amount of an organic peroxide to catalyze the final cure of the resin. There is no advantage in using more than about 5% by weight of peroxide, based on the polymer system, while at least about 0.5% is required for complete cure. Preferably, the peroxide is present in an amount of about 2 to 3%. Useful peroxides include diacyl peroxides such as benzoyl peroxide, p-chlorobenzoyl peroxide, 2,4-dichlorobenzoyl peroxide, lauroyl peroxide, and succinic acid peroxide, dialkyl peroxides such as dicumyl peroxide and di-tert.-butyl peroxide, ketone and aldehyde peroxides such as methyl ethyl ketone peroxide, cyclohexanone peroxide and hydroxyheptyl peroxide, hydroperoxides such as tert.-butyl hydroperoxide, p-methane hydroperoxide, pinane hydroperoxide, cumene hydroperoxide and 2,5-dimethylhexane-2,5-dihydroperoxide, peroxy esters such as tert.-butyl perbonzoate, 2,5-dimethylhexane-2,5-di(peroxybenzoate), di-tert.-butyl diperphthalate, tert.-butyl peracetate, tert.-butyl peroxyisobutyrate and isopropyl percarbonate, as well as many other organic peroxides which have been described in the literature.

These conventional molding compositions are characterized by high melt viscosity; and the distinguishing feature of this invention is the use of diacetone acrylamide in such compositions to give compositions with low melt viscosities, comparing favorably in this respect with commercially acceptable materials which have been used for the purpose despite their poorer electrical properties, such as epoxy resins.

Diacetone acrylamide is a solid reactive monomer with a melting point of approximately 57° C., which I have found to be compatible with diallylphthalate prepolymers and which copolymerizes with them to produce hardened copolymers which, when the amount of diacetone acrylamide is not over about 50 parts by weight per 100 parts of diallyl phthalate, have electrical properties close enough to those of conventional unmodified diallyl phthalates to give commercially satisfactory results. About 2 parts of diacetone acrylamide per 100 parts of diallyl phthalate are needed to give a useful degree of viscosity reduction; optimum results are obtained at about 8 to 12 parts per 100; amounts up to about 50 parts per 100 can be utilized, without any notable advantage or any commercial disadvantage other than cost. Since diacetone acrylamide is a solid, it does not materially affect the caking or blocking tendencies.

Small amounts of diallyl phthalate monomer may be present in the prepolymer, or may be added, up to a total of about 15 parts per 100 prepolymer. Inhibitors, mold release agents, color pigments as desired, and similar conventional additives may be used, in known fashion.

These molding compositions can be prepared by any of the methods used to prepare commercial diallyl phthalate molding compositions. The compositions can be prepared in suitable mixers, by roll mill techniques, by ball milling, etc.

These compositions can be transfer molded, at the temperatures and pressures conventionally used for the transfer molding of diallyl phthalate molding compounds and epoxy molding compounds used for transfer encapsulation molding. Typical transfer molding is done at about 280 to 350° F. and about 50 to 2000 p.s.i.

Typical molding compositions have melt viscosities very close to those obtained with conventional epoxy resins used for encapsulation. Such compounds, when measured on a Brabender Plasticorder at 121° C., at a shear speed of 33 r.p.m., give melt viscosities of about 200 to about 300 meter/grams. The preferred compositions of this invention give melt viscosities of the order of about 250 to 320 meter/grams under the same conditions.

SPECIFIC EXAMPLES OF THE INVENTION

The following specific examples of the invention are given by way of illustration, and not by way of limitation.

Example 1

Four hundred sixty grams of diallyl isophthalate prepolymer, 15 grams of dicumyl peroxide, 40 grams of diacetone acrylamide, 0.2 gram of hydroquinone, and 10 grams of calcium stearate were added to 500 grams of acetone in a Hobart food mixer. The ingredients were mixed until the diallyl isophthalate prepolymer appeared to be dissolved, then 305 grams of Novacite silica and 305 grams of ¼-inch glass fiber were added and mixing continued until the glass was well saturated.

After drying overnight at room temperature, the compound was placed on a rubber compounding two-roll mill at 150° F. to obtain a milled sheet for grinding to a granulated molding compound.

The melt viscosity was determined on a Brabender Plasticorder at 121° C., using a shear speed of 33 r.p.m. The above compound gave 290 meter/grams melt viscosity. The physical properties of the cured molding compound were as follows:

Rockwell hardness (M) _____ 114
Heat deflection temperature, °C _____ 290
Flexural strength, p.s.i. _____ 11,700
Flexural modulus ×10$^6$ p.s.i. _____ 1.5
Percent water absorption _____ 0.24
Dielectric donstant 10$^3$/10$^6$ Hz. _____ 4.1/3.9
Dielectric constant 10$^3$/10$^6$ Hz. (wet) ____ 4.1/4.0
Dissipation factor 10$^3$/10$^6$ Hz. _____ .009/.007
Dissipation factor 10$^3$/10$^6$ Hz. (wet) ____ .009/.007
Insulation resistance (wet—in H$_2$O at 130° C., 16 hours), ohms: 6×10$^{13}$.

The properties compare very closely with an identical composition made with 500 grams of prepolymer and no diacetone acrylamide; this composition, however, has a melt viscosity of 1000 meter/grams.

Example 2

The following ingredients were mixed together as descrbed under Example 1:

| | Grams |
|---|---|
| Acetone | 500 |
| Diallyl orthophthalate prepolymer | 462.5 |
| Diacetone acrylamide | 37.5 |
| t-Butyl perbenzoate | 15 |
| Calcium stearate | 10 |
| Novacite silica | 250 |
| ¼″ glass | 250 |
| Hydroquinone | 0.2 |

The Brabender melt viscosity of the above compound was 310 meter/grams.

The cured resin properties were as follows:

Rockwell hardness (M) _____ 106
Heat deflection temperature, ° C. _____ 162
Flexural strength, p.s.i. _____ 12,800
Flexural modulus ×10$^6$ p.s.i. _____ 1.2
Percent moisture absorption _____ 0.24
Dielectric constant 10$^3$/10$^6$ Hz. _____ 4.2/4.1
Dielectric constant 10$^3$/10$^6$ Hz. (wet) __ 4.4/4.2
Dissipation factor 10$^3$/10$^6$ Hz. _____ .009/.008
Dissipation factor 10$^3$/10$^6$ Hz. (wet) ___ .020/.010
Insulation resistance (wet—at 130° C., 16 hours), ohms: 3×10$^7$.

Example 3

The following ingredients were mixed together:

| | Parts |
|---|---|
| Diallyl isophthalate prepolymer | 100 |
| Diacetone acrylamide | 8.7 |
| DiCup | 3.26 |
| Calcium stearate | 2.18 |
| ¼″ glass fibers | 66.3 |
| Novacite silica | 66.3 |
| A-172 vinyl silane | 1.3 |
| Hydroquinone | 0.0435 |

What is claimed is:

1. A diallylic phthalate molding composition comprising (a) 100 parts by weight of a diallylic phthalate prepolymer, selected from the group consisting of diallyl orthophthlate prepolymer and diallyl isophthalate prepolymer; (b) 2 to 50 parts by weight of diacetone acrylamide; and (c) a catalytic amount of a free radical initiator to convert the molding composition to the thermoset state at elevated temperatures, the composition being characterized by having a melt viscosity significantly lower than identical compositions lacking the diacetone acrylamide, and yielding, on thermosetting, compositions with electrical properties essentially similar to those obtained from identical compositions lacking the diacetone acrylamide.

2. The diallylic phthalate molding composition of claim 1, further comprising up to 100 parts by weight per 100 parts of total polymerizable material of a filler selected from the group consisting of inert mineral fillers and inert fibrous fillers.

3. The composition of claim 1, further comprising up to 15 parts by weight per 100 parts of prepolymer of a monomer selected from the group consisting of diallyl orthophthalate monomer and diallyl isophthalate monomer.

References Cited
UNITED STATES PATENTS

| | | | |
|---|---|---|---|
| 2,595,852 | 5/1952 | Hopper et al. | 260—78.4 UA |
| 3,277,056 | 10/1966 | Coleman | 260—561 N X |
| 3,026,293 | 3/1962 | Caldwell et al. | 260—883 |
| 3,441,535 | 4/1969 | Beacham et al. | 260—40 R |

MORRIS LIEBMAN, Primary Examiner
S. M. PERSON, Assistant Examiner

U.S. Cl. X.R.

260—42.52, 883

UNITED STATES PATENT OFFICE
CERTIFICATE OF CORRECTION

PATENT NO. : 3,810,865
DATED : May 14, 1974
INVENTOR(S) : James L. Thomas

It is certified that error appears in the above-identified patent and that said Letters Patent are hereby corrected as shown below:

Column 2, line 71 "butyl perbonzoate" should read --butyl perbenzoate--.

Column 3, line 52 "200" should read --220--.

Column 4, line 11 "Dielectric donstant" first occurrence should read --Dielectric constant--.

Column 4, after line 62 insert as the last sentence of Example 3 --This gave results very similar to those of Example 1.--, which was omitted by printer.

This certificate supersedes Certificate of Correction issued July 8, 1975.

Signed and Sealed this sixteenth Day of September 1975

[SEAL]

Attest:

RUTH C. MASON
*Attesting Officer*

C. MARSHALL DANN
*Commissioner of Patents and Trademarks*